(12) United States Patent
Valeri

(10) Patent No.: US 10,459,248 B2
(45) Date of Patent: Oct. 29, 2019

(54) UV CURABLE COATING COMPOSITIONS FOR IMPROVED ABRASION RESISTANCE

(71) Applicant: ESSILOR INTERNATIONAL (COMPAGNIE GENERALE D'OPTIQUE), Charenton-le-Pont (FR)

(72) Inventor: Robert Valeri, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 7 days.

(21) Appl. No.: 15/540,197

(22) PCT Filed: Dec. 30, 2014

(86) PCT No.: PCT/IB2014/003141
§ 371 (c)(1),
(2) Date: Jun. 27, 2017

(87) PCT Pub. No.: WO2016/108061
PCT Pub. Date: Jul. 7, 2016

(65) Prior Publication Data
US 2018/0003861 A1    Jan. 4, 2018

(51) Int. Cl.
*G02C 7/02* (2006.01)
*G02B 1/14* (2015.01)
(Continued)

(52) U.S. Cl.
CPC .............. *G02C 7/022* (2013.01); *B32B 27/00* (2013.01); *C09D 183/04* (2013.01); *G02B 1/11* (2013.01);
(Continued)

(58) Field of Classification Search
CPC .......... G02C 7/02; G02C 7/022; G02C 7/024; G02C 7/104; G02C 2202/16; C03C 2218/15
(Continued)

(56) References Cited

U.S. PATENT DOCUMENTS 4,000,115 A    12/1976  Jacobs
4,058,401 A    11/1977  Crivello
(Continued)

FOREIGN PATENT DOCUMENTS

EP    0614957    9/1994
JP    S6046501    3/1985
(Continued)

OTHER PUBLICATIONS

Database WPI Week 198517, Thomson Scientific, London, GB; AN1985-101665, XP002744537, Mar. 1985. (Corresponds to Japanese Patent Application No. S6046501).
(Continued)

*Primary Examiner* — Jordan M Schwartz
(74) *Attorney, Agent, or Firm* — Norton Rose Fulbright US LLP

(57) ABSTRACT

An ophthalmic article and methods of manufacturing the ophthalmic article are described herein. The ophthalmic article can include a first coating and a second coating. The first coating can include an abrasion resistant coating that includes flexible materials. The abrasion resistant coating can be radiation cured. The second coating can include a sputter-applied anti-reflective (AR) coating. Such an ophthalmic article can have a Bayer value of at or between 1.25 and 2.6, between 1.25 and 2.0 or 1.25 and 1.75; and a hand steel wool value of 3 or less.

19 Claims, 2 Drawing Sheets

(51) Int. Cl.
  *B32B 27/00* (2006.01)
  *C09D 183/04* (2006.01)
  *G02B 1/11* (2015.01)

(52) U.S. Cl.
  CPC ............... *G02B 1/14* (2015.01); *G02C 7/024* (2013.01); *G02C 7/02* (2013.01); *G02C 2202/16* (2013.01)

(58) Field of Classification Search
  USPC ...... 351/159.57, 44, 159.49, 159.59, 159.62, 351/159.6, 159.73, 159.75; 427/166; 428/411, 412; 106/287.11
  See application file for complete search history.

(56) References Cited

U.S. PATENT DOCUMENTS

| | | | |
|---|---|---|---|
| 4,069,055 A | 1/1978 | Crivello | |
| 4,101,513 A | 7/1978 | Fox et al. | |
| 4,161,478 A | 7/1979 | Crivello | |
| 4,569,807 A | 2/1986 | Boudet | |
| 6,514,574 B1* | 2/2003 | Valeri | C08J 3/243 427/164 |
| 7,584,865 B2 | 9/2009 | Hsing-Hsien | |
| 7,833,442 B2 | 11/2010 | Chen et al. | |
| 7,850,879 B2 | 12/2010 | Chen et al. | |
| 8,753,551 B2 | 6/2014 | Jethmalani et al. | |
| 2001/0000331 A1* | 4/2001 | Ram | C08F 283/006 428/423.1 |
| 2003/0165698 A1 | 9/2003 | Vaneeckhoutte et al. | |
| 2004/0234789 A1 | 11/2004 | Treadway | |
| 2005/0123771 A1 | 6/2005 | Vaneeckhoutte et al. | |
| 2007/0134459 A1* | 6/2007 | Hubert | B32B 37/00 428/40.1 |
| 2010/0272990 A1* | 10/2010 | Bondesan | B44C 1/10 428/337 |
| 2013/0222913 A1 | 8/2013 | Tomoda et al. | |
| 2014/0057115 A1* | 2/2014 | Treadway | C09D 171/00 428/412 |
| 2014/0342100 A1 | 11/2014 | Valeri | |

FOREIGN PATENT DOCUMENTS

| | | |
|---|---|---|
| WO | WO2013/103334 | 7/2013 |
| WO | WO2016/108060 | 7/2016 |

OTHER PUBLICATIONS

International Search Report for International Application No. PCT/IB2014/003141, dated Aug. 25, 2015.

* cited by examiner ated States Patent (US 10,459,248 B2)

UV CURABLE COATING COMPOSITIONS FOR IMPROVED ABRASION RESISTANCE

CROSS REFERENCE TO RELATED APPLICATIONS

This application is a national phase application under 35 U.S.C. § 371 of International Application No. PCT/IB2014/003141 filed 30 Dec. 2014, the entire contents of which is specifically incorporated by reference herein without disclaimer.

BACKGROUND OF THE INVENTION

A. Field of the Invention

The invention generally relates to curable coating compositions for preparing transparent, abrasion resistant, anti-reflective articles exhibiting abrasion resistance and anti-reflective properties coated therewith. The invention also relates to articles, especially optical and ophthalmic articles.

B. Description of Related Art

The transparency of glass or plastic, in the form of doors, windows, lenses, filters, display devices (for example, display panels) of electronic equipment, and the like, can be impaired by glare or reflection of light. To reduce the amount of glare, for example, on plastic or glass, the surface typically includes a single layer of a coating that provides anti-reflective properties. Anti-reflective coatings are also used on ophthalmic lenses. These anti-reflective coated lenses can improve the cosmetic aspects of the lenses and/or reduce the reflection of light article/air interface over a relatively broad portion of the visible spectrum. With reflections eliminated, lenses with anti-reflective coatings provide better vision for night driving and more comfortable vision for reading and computer use. Anti-reflective coatings are currently used on a variety of lens materials, for example, polycarbonate and/or hi index lenses which are the most reflective. Anti-reflective coatings are also beneficial when applied to the back surface of sunglasses to eliminate "bounce-back" reflections when facing away from the sun.

Current lens manufacturing formulations are targeted to provide lenses having optimum scratch resistance properties. Scratch resistance properties are generally achieved by applying a hard coat to a base substrate. The anti-reflective coating compounds are then deposited in multiple layers to create an anti-reflective film with a specific refractive index to provide maximum reflective properties. Many of the coatings designed to achieve optimum scratch resistance can be hard and brittle and application of anti-reflective layers to these types of coatings can result in coatings or articles that have diminished mechanical properties and abrasion resistance properties, and scratch resistance properties.

Current processes to improve the deposition of anti-reflective layers on a substrate include the use of sputtering techniques. Sputtering involves a physical vapor deposition (PVD) process in a vacuum chamber in the presence of an inert and/or reactive gas. The sputtering process provides a thin film, as the coating or layer, on a surface of a substrate or a coated substrate. The substrate or coated substrate, however, often has functional layers (for example, a hard coat layer or a bonding layer) on its surface. Thus, the sputtered layer is actually applied to a functional layer on some or the entire surface of the substrate or coated substrate. Good adhesion of the sputter applied layer to the functional layer on ophthalmic or optical substrates has proven difficult. For example, common commercial UV curable hard coatings do not adhere well to sputter applied anti-reflective coatings. The poor adherence has been found in hard coatings comprising acrylic, polyurethane, and other common photo-curable functional coatings. Failure can be found in the form of stress crack defects and in adherence, in which adhesion between the sputtered layer and the functional coating is inconsistent or not lasting.

SUMMARY OF THE INVENTION

A solution to the disadvantages of the currently available hard multi-coat anti-reflective ophthalmic lenses has been discovered. The solution is based on the discovery of compositions that enhance the hard multi-coat properties after sputter-applying the anti-reflective layers. The discovery further lies in the selection of the composition of a first coating that is to have an anti-reflective coating disposed thereon. It was surprisingly found that if the first coating included a higher amount of selected flexible materials than an amount of rigid materials, the abrasion resistance and scratch resistance properties of the article increased after application of the sputter anti-reflective (AR) coating. Without wishing to be bound by theory, it is believed that increase in abrasion and scratch resistance properties is due to interaction of the flexible materials with the AR coating materials. These coating compositions remain optically transparent, when desired, and provide other performance properties as needed for the ophthalmic or optical articles. In the ophthalmic article, the first coating can be a hard coating adhered to a first layer of the sputter-applied AR coating.

In a particular instance of the present invention, an ophthalmic article can include a first coating and a second coating. The first coating can include an abrasion resistant coating that includes flexible materials that can be radiation cured. The abrasion resistant coating can be radiation cured. The second coating can include a sputter-applied anti-reflective (AR) coating. The ophthalmic article can have excellent adhesion properties and scratch resistant properties as the ophthalmic article had Bayer value of at or between 1.25 and 2.6, between 1.25 and 2.0 or 1.25 and 1.75 and a hand steel wool value of 3 or less. In some embodiments, the hand steel wool value can be 0, 1, 2, 3, 4, or 5, with 0 to 3 being preferred. Notably, it was discovered that the adhesion and scratch resistant properties increased after sputter-applying the AR coating when the ophthalmic article included flexible materials in the first coating. This was in contrast to ophthalmic articles that included a substantial amount (for example, at least 40 wt. %) of rigid materials in the first coating. Rigid materials are included in conventional ophthalmic articles to provide abrasion resistant properties. In some embodiments, the first coating can be adhered directly to the second coating. In some instances, the first coating is a single layer. In some instances, the AR coating can include at least 4 layers. In certain embodiments, the ophthalmic article can include a single first coating and an AR coating having at least 4 layers (2 alternating refractive index layers). The flexible materials of the first coating can include at least one of an aliphatic epoxy, a difunctional acrylate, a vinyl silane, a vinyl ether, a urethane, a polyester, or any combination thereof. In addition to the flexible material, the first coating can include rigid materials, highly cross-linkable materials, or both. Rigid materials can include silanes or siloxanes such as an epoxy alkoxysilane, a mono-organoalkoxysilane, a tetraorganoxysilane, or a polyorganoxysiloxane or any combination thereof. Highly cross-linkable materials can include at least one of $SiO_2$, pentaerythriotol tri- and tetra acrylate, pentaerythritol triacrylate, ethoxylated pentaerythritol tetraacrylate, dipentaerythritol pentaacrylate, or dipentaerthritolhexaacrylate. The first coating can have from 1% to 100%, 1 to 90%, 1 to 80%, or 1 to 75% by weight of the flexible materials. In instances where the first coating includes rigid materials, the first coating includes from 1 to 75% by weight of the flexible materials and 1 to 10% by weight rigid materials with the balance being other components, for example highly cross-linkable materials and/or other ingredients described herein. In some embodiments, the first coating includes 0 to 85% by weight of highly cross-linkable materials with the balance being flexible materials. In some embodiments, the composition does not include rigid materials.

In one or more embodiments, a method of manufacturing an ophthalmic article is disclosed. The method can include applying a first coating to an ophthalmic article, radiation-curing the first coating, and sputter-applying a second coating onto the first coating. The first coating can include a radiation-curable abrasion resistant coating that can include at least one of flexible materials, rigid materials, and highly cross-linkable materials. In some embodiments, the first coating can be adhered directly to the second coating. In some instances, the first coating is a single layer. In some instances, the AR coating can include at least 4 layers. In certain embodiments, the ophthalmic article can include a single first coating and an AR coating having at least 4 layers. The flexible materials of the first coating can include at least one of an aliphatic epoxy, a difunctional acrylate, a vinyl silane, a vinyl ether, a urethane, a polyester, or any combination thereof. In addition to the flexible material, the first coating can include rigid materials, highly cross-linkable materials, or both. Rigid materials can include silanes or siloxanes such as an epoxy alkoxysilane, a mono-organoalkoxysilane, a tetraorganoxysilane, or a polyorganoxysiloxane or any combination thereof. Highly cross-linkable materials can include at least one of $SiO_2$, pentaerythritol tri- and tetra acrylate, pentaerythritol triacrylate, ethoxylated pentaerythritol tetraacrylate, dipentaerythritol pentaacrylate, or dipentaerthritolhexaacrylate. The first coating can have from 1% to 100%, 1 to 90% 1 to 80%, or 1 to 75% by weight of the flexible materials. In instances where the first coating includes rigid materials, the first coating includes from 1 to 75% by weight of the flexible materials and 1 to 10% by weight rigid materials with the balance being other components, for example highly cross-linkable materials. In some embodiments, the first coating includes 0 to 85% by weight of highly cross-linkable materials with the balance being flexible materials. In some embodiments, an ophthalmic article is manufactured using the methods described herein.

The terms "flexible materials" or "flexible starting materials" refer to materials that include a chemical compound, monomer, resin or any combination thereof that when subjected to radiation curing conditions form a flexible polymer. A flexible polymer can have a backbone that can bend and be deformed as stress is applied. Such a polymer usually has a glass transition temperature (Tg) below room temperature, for example, a Tg of 25° C. to −150° C. or less. If a polyester compound is used as a flexible material, the Tg for the polyester can range from 25° C. to 80° C.

The terms "rigid materials" or "rigid starting materials" refer to materials that include a chemical compound, monomer, resin or any combination thereof that when subjected to radiation curing conditions forms a rigid polymer. A rigid polymer can have a backbone that can be broken as stress applied. Such a polymer can be "glass-like" and usually has a Tg above room temperature, for example, a Tg of 25° C. to 250° C. or more.

The terms "highly cross-linkable materials" or "highly cross-linked materials" refer to materials that include an organic monomer or inorganic compound, functionalized inorganic compound, or any combination thereof, that when subjected to radiation curing conditions forms a cross-linked polymer. A cross-linked polymer can retain its shape when stress is applied, but does not break.

"Bayer value" refer to values determined using the American Standard Testing Material test method ASTM F735.81.

The term "cured" refers to polymerization of starting materials to polymers. Cured includes conditions that allow some free functional groups to remain in the polymer matrix. Non-limiting examples of starting materials include cross-linkable flexible materials, rigid materials and cross-linkable materials.

"Hand steel wool" refers to values obtained for scratch resistance as measures using a hand steel wool text as defined in EP0614957.

Refractive index values are based on a reference wavelength of 550 nm when obtained at an ambient temperature, or at about 25° C. Refractive index can be measured using commercially available refractometers that measure index/birefringence of polymer materials. A non-limiting example of a refractometer is Metricøn Model 2010/M (Pennington, N.J., USA).

The term "chemical compound" refers to organic and inorganic compounds.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The ophthalmic articles of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the ophthalmic lenses and the methods of making said lenses is that the lenses include a combination of a first coating that includes an abrasion resistant coating that includes flexible materials and a second coating that includes a sputter-applied AR coating.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Figure 1:
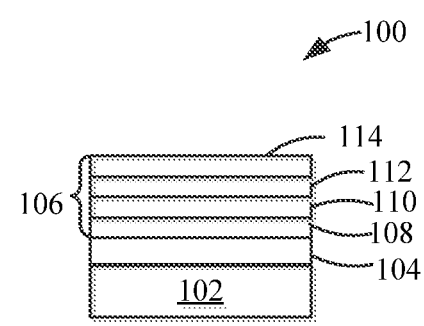
FIG. 1 is a schematic of the ophthalmic article of the present invention.

Current technology formulates radiation curable coatings using acrylates and/or urethanes to form hard, scratch resistant, coatings. Some radiation curable coatings include silanes and dispersions of silicon dioxide to produce hard glass-like coatings. The main problem with most radiation curable coating is that they are formulated for optimal scratch resistance. Such coatings can be hard and brittle coatings. When sputtered layers are applied to hard and brittle type coatings, the final mechanical properties of the ophthalmic article are diminished.

A discovery has been made that addresses the problems associated with current formulations to make abrasive resistant anti-reflective coatings for ophthalmic articles. Notably, the discovery increases the mechanical performance of the article after the application of subsequent sputtered anti-reflective layers. It was surprisingly found that the higher the concentration of flexible materials such as difunctional or polyfunctional monomers, vinyl silanes, vinyl ethers, urethanes, or polyesters, the more the mechanical properties of the ophthalmic article increased after application of the AR coating using sputtering methods. Difunctional or polyfunctional refers two or more reactive groups in the monomer (for example, two vinyl groups, or multiple double bonds present in the molecule, two acrylates, or any combination thereof).

These and other non-limiting aspects of the present invention are discussed in further detail in the following sections.

A. Materials

The compositions throughout the specification include one or more chemical compounds or compositions. The materials used for a first coating can include chemical compounds or compositions that are capable when subjected to radiation curing conditions can form polymeric compositions. The materials include flexible materials in combination with rigid materials and/or highly cross-linkable materials. These coating materials can be used together and/or in combination with other materials to make the first coating. The first coating can have sufficient abrasive resistant properties that it serves a hard coat on a substrate. A second coating can include anti-reflective compositions that can be applied to the first coating using known sputter techniques. In some embodiments, the first coating is capable of adhering to the second coating either through covalent bonding or physical bonding. The anti-reflective coating may include one or more chemical compounds or composition. More than one anti-reflective coating may be applied to the ophthalmic article. These and other non-limiting chemical compounds are discussed in further detail in the following sections.

1. Flexible Materials

Flexible materials that form flexible polymers when subjected to radiation curing can include an aliphatic epoxy, a difunctional acrylate, selected trifunctional acrylates, a vinyl silane, a vinyl ether, a urethane, a polyester, or any combination thereof. The flexible materials can be employed at a weight concentration of 1% to 99.9%, 5% to 85%, 10% to 75%, or 10, 15, 20, 25, 30, 35, 40, 45, 50, 55, 60, 65, 70, 75, 80, 85 90, or 95%, or any contemplated range there between.

The aliphatic epoxy can be a monofunctional, difunctional, or polyfunctional epoxy monomer. An example of aliphatic epoxy monomers are glycidyl monomers which are cycloaliphatic epoxide having one or more cycloaliphatic rings to which an oxirane ring is fused. The aliphatic epoxies may be completely saturated hydrocarbons (alkanes) or may contain double or triple bonds (alkenes or alkynes). They can also contain rings that are not aromatic. Non-limiting examples of aliphatic epoxy materials include neopentyl glycol diglycidyl ether, 1,4 butanediol diglycidyl ether, cyclohexanedimethanol diglycidyl ether, dipropylene glycol diglycidyl ether, propylene glycol diglycidyl ether, trimethylolpropane triglycidyl ether, trimethylolethane triglycidyl ether, propoxylated glycerin tiglycidyl ether, ethylene glycol diglycidyl ether or combinations thereof.

The difunctional acrylate can include more than one ethylenically unsaturated groups. The polyethylenic functional compounds can be described as acrylic acid esters, methacrylic acid esters of aliphatic polyhydric alcohols, such as, for example, the di- and triacrylates and the di- and tri-methacrylates of ethylene glycol, tri-ethylene glycol, tetra-ethylene glycol, tetra-methylene glycol, glycerol, di-ethylene glycol, butylene glycol, propylene glycol, pentanediol, hexanediol, trimethylolpropane, and tri-propylene glycol. Non-limiting examples of difunctional acrylic monomers includes 1,4 butanediol di-acrylate, alkoylated hexanediol di-acrylate, alkoxylated cyclohexane dimethanol diacrylate, ethoxylated bisphenol A diacrylate, 1,3 butylene glycol diacrylate, di-ethylene glycol diacrylate, 1,6 hexanediol diacrylate, neopentyl glycol diacrylate, polyethylene glycol diacrylate, tri-ethylene glycol diacrylate, and tri-propylene glycol diacrylate. Selected trifunctional acrylates can include trimethylolpropane triacrylate, propoxylated trimethylolpropane triacrylate (TMPTA), ethoxylated trimethylolpropane triacrylate and the like including the methacrylate versions of the same. Due to their structure these trifunctional acrylates act as difunctional acrylates in the present invention.

The vinyl silane flexible material can be represented by the chemical formula of $R_n Si(OR')_{4-n}$, where R is a vinyl or a substituted vinyl group, n is between 1 and 3, and R' is a linear or branched alkyl group or ether group. In some instances R' can have having 1 to 5 carbons. Non-limiting examples of vinyl silane compounds include vinyltrimethoxysilane, vinyltriethoxysilane, vinyldimethylethoxysilane, vinylmethyldiethoxysilane, vinylmethyldimethoxysilane, vinyltriisopropoxysilane, vinyltris(2-methoxyethoxy)silane, and any combination thereof.

The vinyl ether material is an aliphatic-, cycloaliphatic-, or poly-ether compound having at least one terminal double bond (vinyl group). Non-limiting examples of vinyl ethers include butanediol divinyl ether, di-ethylene glycol divinyl ether, tri-ethylene glycol divinyl ether, cyclohexanedimethanol divinyl ether, or any combination thereof.

A urethane flexible material can include a polyurethane and/or an urethane acrylate based compound. The urethane acrylate can include from two to about six acrylate groups. Non-limiting urethanes for coating substrates used in ophthalmic articles are described in U.S. Pat. Nos. 7,833,442 and 7,850,879, which is incorporated herein by reference and can include urethane acrylate, aliphatic urethane diacrylates, urethane acrylates that include oligomers containing polyol compounds and diisocyanate compounds. Urethane-base oligomers can be obtained from condensation products of polyisocyanate and polyol. Examples of the isocyanate include methylene bis (p-phenylene diisocyanate), an addition product of hexamethylene diisocyanate hexanetriol, hexamethylene diisocyanate, an adduct of tolylene diisocyanate trimethylolpropane, 1,5-naphtylene diisocyanate, thiopropyl diisocyanate, ethylbenzene-2,4-diisocyante, 2,4-tolylene diisocyanate dimer, hydrogenated xylylene diisocyanate, and tris(4-phenylisocyanate)thiophosphate. Examples of the polyol include polyether-based polyol such as polyoxytetramethylene glycol; polyester-based polyol such as polyadipate polyol and polycarbonate polyol; and copolymers of acrylic acid esters and hydroxyethyl methacrylate.

Polyester flexible materials include polyester acrylate oligomers. Non-limiting examples of polyester-based oligomers include adipic acid and glycol (ethylene glycol, polyethylene glycol, propylene glycol, butylene glycol, polybutylene glycol, etc.), triol (glycerine, trimethylol propane, etc.), polyadipate triol which is a condensation product of a sebacic acid with glycol or triol, or polysebacate polyol. A part of or all of the above aliphatic dicarboxylate may be replaced by other organic acid. Examples of the other organic acid include isophthalic acid, terephthalic acid, phthalic anhydride.

2. Rigid Materials

Rigid materials that form rigid materials when subjected to radiation curing can include epoxy alkoxysilane, a monoorganoalkoxysilane, a tetraorganoxysilane, or a polyorganoxysiloxane or any combination thereof. The rigid materials can be employed at a weight concentration of 1% to 50%, 5% to 45%, 10% to 40%, or 5, 10, 15, 20, 25, 30, 35, 40, 45, and 50%, or any contemplated range there between. Non-limiting examples of materials that form rigid polymers when subjected to radiation curing include glycidoxy methyl trimethoxysilane, glycidoxy methyl triethoxysilane, glycidoxy methyl tripropoxysilane, α-glycidoxy ethyl trimethoxysilane, α-glycidoxy ethyl triethoxysilane, β-glycidoxy ethyl trimethoxysilane, β-glycidoxy ethyl triethoxysilane, β-glycidoxy ethyl tripropoxysilane, α-glycidoxy propyl trimethoxysilane, α-glycidoxy propyl triethoxysilane, α-glycidoxy propyl tripropoxysilane, β-glycidoxy propyl trimethoxysilane, β-glycidoxy propyl triethoxysilane, β-glycidoxy propyl tripropoxysilane, γ-glycidoxy propyl trimethoxysilane, γ-glycidoxy propyl triethoxysilane, γ-glycidoxy propyl tripropoxysilane, γ-glycidoxypropyl pentamethyl disiloxane, γ-glycidoxypropyl methyl diisopropenoxy silane, γ-glycidoxypropyl methyl diethoxysilane, hexamethylcyclotrisilane beta-(3,4-epoxycyclohexyl)-ethyl trimethoxysilane, beta-(3,4-expoxycyclohexyl)-ethyl methyl dimethoxysilane, beta-(3,4-expoxycyclohexyl)-ethyl methyl diethoxysilane, beta-(3,4-epoxycyclohexyl)-ethyl triethoxysilane, or any combination thereof, with glycidoxypropyl trimethoxysilane, γ-glycidoxypropyl methyldiethoxysilane, tetraethoxysilane, tetramethoxysilane, hexaethoxydisiloxane, glycidoxypropyl triethoxysilane, tris(trimethylsiloxy)silane, tris(trimethylsiloxy)silylethyltriethoxysilane, 1,1,2 tris(triethoxysilyl)ethane, methyltriethoxysilane, methyltrimethoxysilane, ethyltrimethoxysilane, ethyltriethoxysilane, phenyltriethoxysilane, glycidoxypropyl dimethoxysilane, or any combination thereof being preferred.

3. Highly Cross-linkable Materials

Highly cross-linkable materials include organic monomers and inorganic compounds that can form covalent bonds between two or more polymeric chains to form a cross-linkable coating. Non-limiting examples of highly cross-linkable compounds include pentaerythritol tri- and tetra acrylate, pentaerythritol triacrylate, ethoxylated pentaerythritol tetraacrylate (PTTA), dipentaerythritol pentaacrylate, dipentaerthritolhexaacrylate, or any combination thereof. $SiO_2$ particles can be dispersed in the highly cross-linkable materials. $SiO_2$ can be functionalized and dispersed in either solvent or an acrylic monomer. A functionalized $SiO_2$ can include colloidal $SiO_2$ particles that have been surface modified with acrylates or epoxy compounds. Functionalizing the acrylic silane can prevent agglomeration in the solvent or the acrylic monomer. The highly cross-linkable materials can include from 0.01 to 55% by weight of colloidal $SiO_2$ particles, functionalized $SiO_2$, or both. The composition can include 0 to 80% of highly cross-linkable materials. $SiO_2$ dispersed in solvent or acrylic monomers are commercially available. Non-limiting examples of commercially available surface treated $SiO_2$ dispersed particles in solvent or monomer include Nanocryl® C-140 (50% $SiO_2$ in 50% hexandioldiacrylate), Nanocryl® C-150 (50% $SiO_2$ in 50% trimethylolpropanetriacrylate trimethylolproapnetriacrylate), Nanocryl® C-165 (50% $SiO_2$ in 50% alkoxylated pentaerythritol tetraacrylate) from Evonik Industries, Inc. (Germany), and IPA-AC-2101 (30 wt % $SiO_2$ dispersed in 70 wt. % isopropyl alcohol and PM-AC-2101 (30 wt % $SiO_2$, dispersed in 70 wt. % 1-methoxy-2-propanol from Nissan Chemical America (Pasadena, Tex., USA).

4. Anti-reflective Materials

The anti-reflective materials can include any material sufficient to provide anti-reflective coating through a sputtering process. In some instances, the AR layers include one or more dielectric materials selected from a metal oxide, a metal nitride, and a metal nitride oxide. Non-limiting examples of materials for the AR layers include $SiO_2$, $MgF_2$, $ZrF_4$, $AlF_3$, chiolite ($Na_3[Al_3F_{14}]$), cryolite ($Na_3[AlF_6]$), $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$, $Al_2O_3$, $Si_3N_4$, or any combination thereof. In some embodiments, the dielectric material can include a silicon based polymeric dielectric.

5. Other Materials

Other materials may be present in the ophthalmic article and/or used in the process to make the ophthalmic article. Such materials include initiators or catalysts, accelerators, binders, solvents, wetting agents, surfactants, pigments, fillers, and materials to make a lens such as polycarbonates, acrylics, thiourethane polymers, episulfide polymers.

(i) Initiators, Catalysts, Accelerators

Initiators or catalysts known in the art that are activated by some form of radiation can be used to make the ophthalmic article of the present invention. These initiators include one or more cationic or free radical initiators. Non-limiting examples of cationic initiators include ones having or containing an aromatic onium salt, including salts of Group VA elements (e.g., phosphonium salts, such as triphenyl phenacylphosphonium hexafluorophosphate), salts of Group VIA elements (e.g., sulfonium salts, such as triphenylsulfonium tetrafluoroborate, triphenylsulfonium hexafluorophosphate and triphenylsulfonium hexafluoroantimonate, triarylsulfoniumhexafluorophosphate, triarylsulfoniumhexafluoroantimonate), and salts of Group VIA elements (e.g. iodonium salts, such as diphenyliodonium chloride and diaryl iodonium hexafluoroantimonate). Additional examples may be found in U.S. Pat. No. 4,000,115 (e.g., phenyldiazonium hexafluorophosphates), U.S. Pat. Nos. 4,058,401, 4,069,055, 4,101,513, and 4,161,478, all of which are hereby incorporated by reference in their entirety. The amount of cationic photoinitiator may be up to 10 wt. % based on epoxy content. The amount of cationic photoinitiator may be from about 3 wt. % to about 8 wt. %.

Free-radical initiators can be photoactivatable and/or thermally activated. Non-limiting examples, of free-radical initiators that are photoactivatable include but are not limited to xanthones, haloalkylated aromatic ketones, chloromethylbenzophenones, certain benzoin ethers (e.g., alkyl benzoyl ethers), certain benzophenone, certain acetophenone and their derivatives such as diethoxy acetophenone and 2-hydroxy-2-methyl-1-phenylpropan-1-one, dimethoxyphenyl acetophenone, benzylideneacetophenone; hydroxy ketones such as (1-[4-(2-hydroxyethoxy)-phenyl]-2-hydroxy-2-methyl-1-propane-1-one) (Irgacure® 2959, last registered with BASF SE Company, Germany), 2,2-di-sec-butoxyacetophenone, 2,2-diethoxy-2-phenyl-acetophenone, 1-hydroxy-cyclohexyl-phenyl-ketone (e.g., Irgacure® 184) and 2-hydroxy-2-methyl-1-phenylpropane-1-one (e.g., Darocur® 1173, last registered with Burrough Wellcome, North Carolina, US); alpha amino ketones, particularly those containing a benzoyl moiety, otherwise called alpha-amino acetophenones, for example 2-methyl 1-[4-(methylthio)phenyl]-2-morpholinopropan-1-one (Irgacure® 907), (2-benzyl-2-dimethyl amino-1-(4-morpholinophenyl)-butan-1-one (Irgacure® 369), and benzil ketals, such as ethyl benzoin ether, isopropyl benzoin ether. In some embodiments, the free radical initiator may be selected from one or more of α,α-dimethoxy-α-phenyl acetophenone, and 2-hydroxy-2-methyl-1-phenylpropane-1-one, 1-hydroxycyclohexyl phenyl ketone, and 2,2-dimethoxy-1,2-diphenylethane-1-one [sic]. Further representative free radical photoinitiators include but are not limited to acylphosphine oxide type such as 2,4,6,-trimethylbenzoylethoxydiphenyl phosphine oxide, bisacylphosphine oxides (BAPO), monoacyl and bisacyl phosphine oxides and sulphides, such as phenylbis(2,4,6-trimethylbenzoyl)-phosphine oxide (Irgacure® 819); and triacyl phosphine oxides. In some embodiments, combinations of free-radical initiators are preferred. The initiators, including photoinitiators and/or free radical initiators, are generally present in an amount from about 0.01% to about 10% by weight relative to the total weight of the composition. In some embodiments, the total amount of photoinitiator(s) is between about 1% and 8% by weight relative to the total weight of the composition.

Curing of an epoxy group may be accelerated by addition of small quantities of an accelerator. Suitable and effective accelerators include tertiary amines, carboxylic acids and alcohols.

(ii) Solvents

The first coating can further include a solvent suitable for the polymerizable polymer(s) described above. The solvent may be suitable for dispersing any of the components of the described composition, including any one or more of the flexible, rigid or highly cross-linkable materials, and/or a binder. In some embodiments, the solvent is a polar solvent, such as any one or more of primary alcohols and glycols. Non-limiting examples of solvents include methanol, ethanol, propanol, butanol, or is a glycol, including propylene glycol, glycol monoether, and any derivative and variant thereof. The solvent can be used alone or in combination. In some instances, the solvents are anhydrous or substantially dry. In some embodiments, environmentally benign solvents are used. In some embodiments, the coating composition is substantially free of volatile solvents. Formulations having 100% solids are preferred with certain curing processes and equipment, such as those involving UV curing.

(iii) Wetting Agents

In some instances, the first coating includes a wetting agent. The wetting agent is preferably one compatible with a binder, such as a silicone diacrylate or a silicone hexaacrylate material (e.g., Ebecryl® 1360, last registered to AI Chem and Cy US Acquico, Inc., Delaware, US).

(iv) Surfactants

In some instances, a low odor surfactant may also be included. In one or more embodiments, a nonionic surfactant is provided in the first coating composition. A non-limiting example is a nonionic fluorosurfactant containing at least one fluoroalkyl or polyfluoroalkyl group, an example of which is a fluoroaliphatic polymeric ester in a glycol solvent (e.g., dipropylene glycol monomethyl ether), such as Novec™ FC-4434 (with 3M™ Company, Minnesota, US). Another non-limiting example is a fluorocarbon containing organically modified polysiloxane in methoxypropanol (e.g., EFKA 3034, having 50% solids, last registered with BASF SE Company, Germany). A representative polymeric fluorocarbon compound containing 100% solids is EFKA 3600. Additional non-limiting examples include but are not limited to poly(alkylenoxy)alkyl-ethers, poly(alkylenoxy)alkyl-amines, poly(alkylenoxy)alkyl-amides, polyethoxylated, polypropoxylated or polyglycerolated fatty alcohols, polyethoxylated, polypropoxylated or polyglycerolated fatty alpha-diols, polyethoxylated, polypropoxylated or polyglycerolated fatty alkylphenols and polyethoxylated, polypropoxylated or polyglycerolated fatty acids, ethoxylated acetylene diols, compounds of the block copolymer type comprising at the same time hydrophilic and hydrophobic blocks (e.g., polyoxyethylene block, polyoxypropylene blocks), copolymers of poly(oxyethylene) and poly(dimethylsiloxane) and surfactants incorporating a sorbitan group.

(v) Pigments and/or Fillers

Pigments and/or fillers may be included when desired and for certain uses. In one or more embodiments, no pigment is used when the coating is to be clear. In some embodiments, both blue and red toners are included in a small quantity to reduce yellowing (yellowness) of the coating. Suitable pigments may include an organic and inorganic color pigment. Examples include but are not limited to titanium dioxide, iron oxide, carbon black, lampblack, zinc oxide, natural and synthetic red, yellow, toluidine and benzidine yellow, phthalocyanine blue and green, and carbazole violet, and extenders (e.g., crystalline silica, barium sulfate, magnesium silicate, calcium silicate, mica, micaceous iron oxide, calcium carbonate, zinc powder, aluminum and aluminum silicate, gypsum, and feldspar). In some embodiments, fillers may be added to enhance scratch resistance and/or abrasion resistance. For example, functionalized metal oxides may be included in amounts of up to about 25 wt. % or up to about 30 wt. % for improved abrasion resistance and increasing the refractive index of the coating.

(vi) Substrate Materials

The substrate may be any substrate. In one or more embodiments, the substrate is formed from an optical material, such as an ophthalmic lens such as glass (inorganic or organic), and organic polymeric materials. Non-limiting examples of substrate materials include polycarbonates made from bisphenol-A polycarbonate (e.g., LEXAN® registered to Sabic Innovation Plastics), MAKROLON® (registered to Bayer Aktiengesellschaft, Germany), or obtained by polymerization or copolymerization of diethylene glycol bis(allyl carbonate) (e.g., CR-39®, last registered to PPG Industries, Ohio, US), ORMA® (registered to Essilor International, France); acrylics having an index of 1.56 (e.g., ORMUS® registered to Essilor International, France); thiourethane polymers; episulfide polymers; polyesters; polyamides; polyimides; acrylonitrile-styrene copolymers; styrene-acrylonitrile-butadiene copolymers; polyvinyl chloride; butyrates; polyethylene; polyolefins; epoxy resins; and epoxy-fiberglass composites, or any combination thereof.

B. Amounts of Ingredient

It is contemplated that the compositions of the present invention can include any amount of the ingredients discussed in this specification. The compositions can also include any number of combinations of additional ingredients described throughout this specification (e.g., wetting agents, initiators, solvents, etc.). The concentrations of the any ingredient within the compositions can vary as long as the amount of flexible material is greater than the amount of rigid materials. In non-limiting embodiments, for example, the compositions can comprise, consisting essentially of, or consist of, in their final form, for example, at least about 0.0001%, 0.0002%, 0.0003%, 0.0004%, 0.0005%, 0.0006%, 0.0007%, 0.0008%, 0.0009%, 0.0010%, 0.0011%, 0.0012%, 0.0013%, 0.0014%, 0.0015%, 0.0016%, 0.0017%, 0.0018%, 0.0019%, 0.0020%, 0.0021%, 0.0022%, 0.0023%, 0.0024%, 0.0025%, 0.0026%, 0.0027%, 0.0028%, 0.0029%, 0.0030%, 0.0031%, 0.0032%, 0.0033%, 0.0034%, 0.0035%, 0.0036%, 0.0037%, 0.0038%, 0.0039%, 0.0040%, 0.0041%, 0.0042%, 0.0043%, 0.0044%, 0.0045%, 0.0046%, 0.0047%, 0.0048%, 0.0049%, 0.0050%, 0.0051%, 0.0052%, 0.0053%, 0.0054%, 0.0055%, 0.0056%, 0.0057%, 0.0058%, 0.0059%, 0.0060%, 0.0061%, 0.0062%, 0.0063%, 0.0064%, 0.0065%, 0.0066%, 0.0067%, 0.0068%, 0.0069%, 0.0070%, 0.0071%, 0.0072%, 0.0073%, 0.0074%, 0.0075%, 0.0076%, 0.0077%, 0.0078%, 0.0079%, 0.0080%, 0.0081%, 0.0082%, 0.0083%, 0.0084%, 0.0085%, 0.0086%, 0.0087%, 0.0088%, 0.0089%, 0.0090%, 0.0091%, 0.0092%, 0.0093%, 0.0094%, 0.0095%, 0.0096%, 0.0097%, 0.0098%, 0.0099%, 0.0100%, 0.0200%, 0.0250%, 0.0275%, 0.0300%, 0.0325%, 0.0350%, 0.0375%, 0.0400%, 0.0425%, 0.0450%, 0.0475%, 0.0500%, 0.0525%, 0.0550%, 0.0575%, 0.0600%, 0.0625%, 0.0650%, 0.0675%, 0.0700%, 0.0725%, 0.0750%, 0.0775%, 0.0800%, 0.0825%, 0.0850%, 0.0875%, 0.0900%, 0.0925%, 0.0950%, 0.0975%, 0.1000%, 0.1250%, 0.1500%, 0.1750%, 0.2000%, 0.2250%, 0.2500%, 0.2750%, 0.3000%, 0.3250%, 0.3500%, 0.3750%, 0.4000%, 0.4250%, 0.4500%, 0.4750%, 0.5000%, 0.5250%, 0.0550%, 0.5750%, 0.6000%, 0.6250%, 0.6500%, 0.6750%, 0.7000%, 0.7250%, 0.7500%, 0.7750%, 0.8000%, 0.8250%, 0.8500%, 0.8750%, 0.9000%, 0.9250%, 0.9500%, 0.9750%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, or 99% or any range derivable therein, of at least one of the ingredients that are mentioned throughout the specification and claims. In non-limiting aspects, the percentage can be calculated by weight or volume of the total composition. A person of ordinary skill in the art would understand that the concentrations can vary depending on the addition, substitution, and/or subtraction of ingredients in a given composition.

In a particular aspect of the present invention, the amount of flexible materials ranges of 1% to 99.9%, 5% to 85%, 10% to 75%, or 10, 15, 20, 25, 30, 35, 40, 45, 50, 55, 60, 65, 70, 75, 80, 85 90, or 95% by weight or any contemplated range there between. In a particular embodiment, the amount of flexible materials can range from 1% to 75%. The amount of highly cross-linkable materials can range from 0% to 80%. In some embodiments, an amount of flexible materials ranges from at least 5% by weight with the balance being highly cross-linkable materials ranges ingredients and additional ingredients such as wetting agents, surfactants, solvent, initiators and the like. In some embodiments, an amount of flexible materials ranges is from 5 to 8% by weight and the amount of highly cross-linkable materials ranges from 45 to 50% by weight with the balance being additional ingredients, such as wetting agents, solvents, surfactants and initiators. When rigid materials are used in the composition, the total amount of flexible materials must be greater than the amount of rigid materials. In some embodiments, the composition can include 30 to 75 wt. % of flexible materials and 10 wt. % or less of rigid materials with the balance being other ingredients and/or highly cross-linkable materials. In some embodiments, a weight ratio of flexible materials to rigid materials ranges from 2.5:1 to 1.1:1, or from 2.3:1 to 1.5:1 or 2:0: to 1.75:1, or 2.3:1. In certain embodiments, 47 wt. % of flexible material (for example, vinyltrimethoxy silane) is used in combination with 47 wt. % of highly cross-linkable materials (for example, 50 wt. % SiO$_2$ in PTTA or 50 wt. % SiO$_2$ in TMPTA with the balance being other ingredients. In another embodiment, 8 wt. % of flexible material is used in combination with 50 wt. % highly cross-linkable material (for example 37 wt. % of 50 wt. % SiO$_2$ dispersed in PTTA and 10 wt. % pentaerythritol triacrylate) with the balance being other ingredients. In a particular embodiment, 36 wt. % of flexible materials (for example, 17 wt. % of vinyltrimethoxysilane and 20 wt. % 1,4-butanediol diacrylate) is used in combination with 7 wt. % of rigid materials (for example, glycidoxypropyltrimethoxysilane) and 53 wt. % of highly cross-linkable materials (for example, 29 wt. % of 50 wt. % SiO$_2$ dispersed in TMPTA and 24 wt. % of ethoxylated pentaerythritol tetraacrylate) with the balance being other ingredients. In some embodiments, 8 wt. % of flexible material (for example, 1,4-butanediol diacrylate) be used in combination with 70 wt. % of highly cross-linkable material (for example, 28 wt. % of 50 wt. % of SiO$_2$ dispersed in 1-methoxy-2-propanol, 35 wt. % of SiO$_2$ dispersed in isopropyl alcohol, 6 wt. % of 50 wt. % SiO$_2$ dispersed in PTTA, 0.2 wt. % of pentaerythritol tri and tetra acrylate, 0.99 wt. % of pentaerythritol triacrylate and 0.25 wt. % of ethoxylated pentaerythritol tetraacrylate) with the balance being other ingredients. Non-limiting examples of other ingredients include initiators, solvents, surfactants, wetting agents and the like.

C. Ophthalmic Article

FIG. 1 is a schematic of ophthalmic article 100 of the present invention. Ophthalmic article 100 can be obtained using the methods described throughout this specification. In some embodiments ophthalmic article 100 can be a lens adapted for mounting in eyeglasses, masks, visors, helmets, goggle, other frames, etc., for protection of the eye and/or to correct vision, thus corrective or un-corrective. Such a lens may be an afocal, unifocal, bifocal, trifocal, or progressive lens. Ophthalmic article 100 may be produced with traditional geometry or may be produced to be fitted to an intended frame. Ophthalmic article 100 can include substrate 102, first coating 104, and second coating 106.

Substrate 102 may be any substrate. In one or more embodiments, substrate 102 is formed from an optical material, such as an ophthalmic lens. This includes glass (inorganic or organic), and polycarbonates, for example, those made from bisphenol-A polycarbonate (e.g., LEXAN® registered to Sabic Innovation Plastics), MAKROLON® (registered to Bayer Aktiengesellschaft, Germany), or obtained by polymerization or copolymerization of diethylene glycol bis(allyl carbonate) (e.g., CR-39®, last registered to PPG Industries, Ohio, US), ORMA® (registered to Essilor International, France), as well as acrylics having an index of 1.56 (e.g., ORMUS® registered to Essilor International, France), thiourethane polymers, and episulfide polymers. Additional substrates from organic polymeric materials may be used. Additional representative examples include, but are not limited to, polyesters, polyamides, polyimides, acrylonitrile-styrene copolymers, styrene-acrylonitrile-butadiene copolymers, polyvinyl chloride, butyrates, polyethylene, polyolefins, epoxy resins and epoxy-fiberglass composites, to name a few. Substrate 102, can have properties that include a high transparency, an absence of, or optionally a very low level of light scattering or haze (e.g., haze level less than 1%), a high Abbe number of greater than or equal to 30 and preferably of greater than or equal to 35, avoidance of chromatic aberrations, a low yellowing index and an absence of yellowing over time. Additionally, substrate 102 may exhibit good impact strength, a good suitability for various treatments, and in particular good suitability for coloring. In some embodiments, substrate 102 can exhibit a glass transition temperature value of greater than or equal to 65° C., or greater than 90° C. Substrate 102 can be further functionalized, for example pre-treating or post-treating the substrate. In some embodiments, the functionalization occurs prior to application of the hard coating. Functionalization may include one or more functional coatings and/or functional films. Said additional film(s) or coating(s) may be applied to either the surface to which the first coating 102 is applied, to an alternative surface (e.g., applied to a carrier for later transfer to the substrate) or an opposing surface. Functionalities may include, but are not limited to anti-impact, anti-abrasion, anti-soiling, anti-static, anti-reflective, anti-fog, anti-rain, self-healing, polarization, tint, photochromic, and selective wavelength filter which could be obtained through an absorption filter or reflective filter (e.g., filtering ultra-violet radiation, blue light radiation, or infra-red radiation). The functionality may be added by processes known in the art or later identified.

First coating 102 can be applied directly to the surface of an untreated or pre-treated substrate, to a functional surface on the substrate, or to an alternative surface (e.g., a carrier) and later transferred to the substrate or its functionalized surface. First coating 102 can include flexible materials alone or in combination with rigid materials, highly crosslinkable materials and other ingredients. First coating can have a thickness of from 1 to 500 µm, 20 to 200 µm, or 30 to 100 µm. In a particular embodiment, the thickness is from 3 to 10 µm, or 4 to 9 µm, or 5 µm. In a particular aspect, the first coating is a single layer.

Second coating 106 can be an AR coating and include layers 108, 110, 112 and 114. Layers 108, 110, 112, and 114 may be deposited on first coating using sputter techniques known in the art and described throughout this specification. Layers 108, 110, 112, and 114 can have the same or different refractive indexes. In some embodiments, the AR coating is one or more layers. In a particular aspect, AR coating 106 can include four or more dielectric material layers of alternating refractive indexes. The total physical thickness of the AR coating is 100 nm or more, 150 nm or more, or 200 nm, or up to 250 nm, up to 500 nm, or up to 1 µm. In some embodiments, first layer 108 can have a high refractive index (HRI), second layer 110 can have a medium refractive index (MRI) or a low refractive index (HRI), third layer 112 can have a HRI and fourth layer 114 can have a MRI or LRI. It should be understood that the refractive indexes of the layers are matched to produce a lenses with the desired anti-reflective properties. The LRI layers can a refractive index of 1.55 or less, or lower than 1.50, or lower than 1.45. The LRI layers can include, but are not limited, to one or more of $SiO_2$, $MgF_2$, $ZrF_4$, $AlF_3$, chiolite ($Na_3Al_3F_{14}$]), cryolite ($Na_3[AlF_6]$), and various mixtures or doped variations thereof, including $SiO_2$ or $SiO_2$ doped with $Al_2O_3$, fluorine, or carbon, as examples. In some embodiments, at least one LRI layer 110 or LRI layer 114 is a silicon containing material. In some embodiments, one or both of LRI layers 110 and 114 are silicon oxide. HRI layers 108 and 112 can have a refractive index higher than 1.55, or higher than 1.6, or higher than 1.8, or higher than 2. The HRI layers 108 and 112 can include, but is not limited to, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$ or $Al_2O_3$, and $Si_3N_4$, as well as various mixtures. In some embodiments, one or both of HRI layers 108 and 112 are a silicon containing material. In some embodiments, HRI layers 108 and 112 are silicon nitride. In some embodiments, AR coating 106 includes 2, 3, 4, 5, 6 or more of alternating layers of HRI and LRI layers, that are silicon nitride and silicon oxide, respectively.

D. Method of Making an Ophthalmic Article

Figure 2:
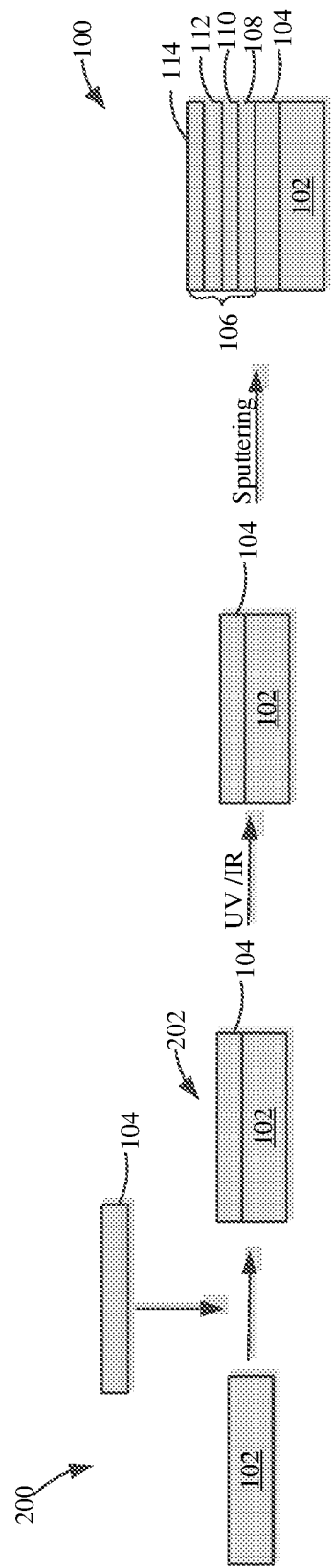
FIG. 2 is a schematic of a method for making the ophthalmic article of the present invention.

Ophthalmic article 100 can be made using known techniques in the art using the compositions disclosed throughout the specification. FIG. 2 is a schematic depicting method 200 for preparing ophthalmic articles 100. As discussed above substrate 200 can be a glass or made from organic polymers. In some embodiments, substrate 200 is prepared by providing substrate materials and an initiator or catalyst to a mold of a desired shape and subjecting the monomer solution to polymerizing conditions. Non-limiting examples of making substrate 200 are described in U.S. Pat. No. 8,753,551 to Jagdish et al., and U.S. Pat. No. 7,854,865 to Chiu et al., and U.S. Pat. No. 4,569,807 to Boudet. Substrate 200 can be made from thermoplastics or from thermoset lenses (for example, CR-39). Substrates made from thermoplastics include a semi-finished polycarbonate lens or finished single vision lens (copolymerized diethylene glycol bis(allyl carbonate). In some embodiments, substrate 200 can be surface-treated on one or both of its opposing sides. Surface treatment will generally take place prior to providing first coating layer 104. Surface treatment can include an oxidation thereof or a roughening, to make the surface of substrate 102 more adhesive to the first coating 102 or to a prior formed functionalized layer. Surface treatment may be provided by corona discharge, chromate (wet process), flame, hot air, ozone or ultraviolet ray (e.g., for oxidation), and other means for surface roughening, such as sandblasting, or solvent treatment. In some embodiments, surface treatment includes a corona discharge method. After surface treatment, substrate 200 can be washed and dried.

First coating 104 can be applied to substrate 102 using known coating techniques to form uncured substrate 202. The first coating can include the flexible materials alone or in combination with other materials described herein. The first coating 104 can be formulated as 100% solids or solvent-borne. In one aspect, the composition is formulated with minimal amounts of water or in the absence of water. Non-limiting examples of providing the first coating 104 to the substrate include dip coating, spray coating, spin coating, gravure coating or brushing. The first coating layer composition can be applied directly to the surface of an untreated or pre-treated substrate, to a functional surface on the substrate, or to an alternative surface (e.g., carrier) and later transferred to the substrate or its functionalized surface. The transfer process can include providing first coating composition to a carrier, and then transferred from the carrier to the substrate. Thus, the carrier can include the first coating 104, to which second coating layer 106 is then applied. These layers when formed may then be transferred to the substrate, generally via a lamination process that may or may not require an adhesive there between. Lamination refers to obtaining a permanent contact between a film which comprises at least one functionality (for example, a hydroxyl group or olefin) and the surface containing the substrate. Lamination may include a heating and/or polymerization step to finalize the adhesion between the layers from the carrier onto the substrate. Uncured substrate 202 can be subjected to curing conditions sufficient to cure the first coating composition into a polymeric coating. The curing conditions can include radiation curing, which can include heat and/or UV radiation. Uncured substrate 202 can be subjected to temperature and light to obtain a temperature below or at the glass transition temperature ($T_g$) of the fully cured network in order to achieve maximum properties and form cured substrate 204. In some embodiments, the curing temperature can be increased in a step-wise fashion to control the rate of curing and prevent excessive heat build-up from the exothermic reaction.

A non-limiting example of a spin-coating radiation cured process includes applying first layer 104 to substrate 102 using a spin-coating apparatus to form uncured substrate 202. The first coating 104 can be applied as films having thickness of anywhere between about 1 micrometer and 9 micrometers or between about 2 micrometers and 7 micrometers. A non-limiting example of a dip coating process includes dipping substrate 200 in one of several thermally cured hard coatings including, but not limited to NTPC or PDQ, and then surfaced to either plano (0.00) or −2.00 power, followed by application of a UV curable first coating 104 described herein to the concave surfaced side. Uncured substrate 202 can then be cured under a quartz UV bulb that provides light from 200 to 600 nm (an H+ bulb). In some embodiments, the uncured substrate 202 is placed on a moving belt and subjected to UV/infrared light to form cured substrate 204.

In some embodiments, cured substrate 204 can be allowed to rest, generally overnight, and then subjected to pretreatments prior to sputter coating. The pretreatments included washing with a mild detergent followed by air drying, chemical treatment, and plasma treatment. The chemical treatment was a mild caustic detergent wash (comprising dilute NaOH) in an ultrasonic environment, followed by neutralization with a dilute acid solution (comprising 5% acetic acid) in an ultrasonic environment and then a water rinse (e.g., deionized water). Cured substrate 204 can be subjected to further heating to remove water from the cured article. For example, the cured article can be dried at 60° C. for 1 hr.

In some embodiments, uncured substrate 202 is subjected to conditions that allow some free functional (hydroxy or olefins) groups remain in the composition. Without wishing to be bound to by theory, it is believed that the functional groups bond to the materials used for the AR coating, which adheres the second AR coating 104 to the first coating 102. This type of bonding enables the lenses to be made in the absence of a primer or adhesive layer between any of the described hard coating and an AR coating.

Second coating 106 can be deposited on cured substrate 204 using an AR sputter apparatus. Such apparatus are commercially available. A non-limiting example of an AR sputter apparatus is a Satisloh SP200 sputter coating machine. Layers 108, 110, 112, and 114 can be deposited on cured article 204 in the order of a desired reflective index to form ophthalmic article 102. A non-limiting example, of the order of reflective index includes first layer 108 having a HRI of 34 nm, second layer 110 having a LRI of 22 nm, third layers 112 having a HRI of 76 nm, and fourth layer 114 having a LRI of 88 nm with a total thickness of the second coating being 220 nm.

Examples

The present invention will be described in greater detail by way of specific examples. The following examples are offered for illustrative purposes only, and are not intended to limit the invention in any manner Those of skill in the art will readily recognize a variety of noncritical parameters which can be changed or modified to yield essentially the same results.

Equipment and Process

Equipment: All radiation cured lenses were coated with a Headway Research bench top spin coater and cured using a Fusion Systems belt conveyor with an ultraviolet/infrared bulb (H+ bulb).

Substrates: Surfaced semi-finished were used as substrates. The substrates were hand washed with a mild detergent followed by air drying.

Cleaning: The washed and dried substrates were subjected to a chemical treatment consisting of a mild caustic (NaOH) detergent wash with ultrasonication followed by neutralization with dilute (5%) acetic acid solution with ultrasonication followed by a deionized water rinse. The lenses were then baked for 1 hr. at 60° C. following washing to drive any absorbed water out of the coating(s) and the lens.

Treatment: The lenses were spin coated with the formulations set forth in Examples 1-3 and subjected to radiation curing conditions. All UV coated lenses were allowed to sit overnight prior to further processing to ensure that any dark cure was complete. The lenses were then subjected to the chemical treatment described herein, and then baked for 1 hr. at 60° C. to remove any residual water. After cooling, the lenses were sputter AR coated. The UV cured lenses were subjected to a plasma cleaning/etching step and is then coated by alternating high and low index layers of $Si_3N_4$ and $SiO_2$ using a standard 4 layer AR process.

Testing

Abrasion/Scratch resistance: Sand Bayer and hand steel wool (HSW) testing were performed to evaluate the abrasion and scratch resistance of the UV coatings and the AR coated lenses. BAYER values: A high value in the BAYER test corresponds to a high degree of abrasion resistance.

HSW testing and values: Extra fine n 000 STARWAX® steel wool was used. A piece of steel wool about 3 cm by 3 cm was folded on itself and used to make 10 to-and-fro rubbing movements on the coated lens in the fiber direction using a constant pressure throughout the operation. The lens was then rubbed with a dry cloth and rinsed with alcohol. The state of the lens was then estimated and classified as follows: 0: no observed scratching; 1: lens very slight scratched (0 to 5 scratches), 2: lens slightly scratched (up to 20 scratches), 3: lens somewhat scratched (up to 50 scratches), 4: lens very scratched (more than 50 scratches), 5: bare substrate.

Examples 1-3 and Comparative Examples A-C

Ophthalmic Articles with Flexible and Highly Cross-Linkable Materials

Six substrates were coated with the formulations of the current invention. Three substrates (Examples 1-3) was subjected to sputter AR coating as described in the Equipment and Process section, and then tested as described in the Testing section. The three other substrates (Comparative Examples A-C) were not subjected to sputter AR coating. Table 1 lists formulations and testing for Examples 1-3 of the present invention and Comparative Examples A-C. The flexible, highly cross-linkable, rigid materials, initiators, solvents and surfactants can be any one of the materials described throughout the specification.

Comparing Examples 1-3 to Comparative Examples A-C in Table 1, it was observed that incorporating flexible materials into the first coating material increased the abrasion and scratch properties after the application of sputter applied anti-reflective coating.

to sputter AR coating as described in the Equipment and Process section, and then tested as described in the Testing section. The second substrate (Comparative Example E) was not subjected to sputter AR coating. Table 2 lists formulations and testing for Example 4 of the present invention and Comparative Example E. The flexible material, rigid material, highly cross-linkable material wetting agent, initiators and surfactant can be any of the compounds described in the above sections.

TABLE 2

| Material Type | | Example 4 (wt. %) | Comparative Example E (wt %) |
|---|---|---|---|
| Flexible | | 16.73 | 16.73 |
| Flexible | | 19.12 | 19.1 |
| Rigid | | 7.17 | 7.17 |
| Highly Cross-linkable | | 28.68 | 28.68 |
| Highly Cross-linkable | | 23.90 | 23.90 |
| Wetting Agent | | 0.33 | 0.33 |
| Initiator | | 2.29 | 2.29 |
| Initiator | | 1.19 | 1.19 |
| Surfactant | | 0.59 | 0.59 |
| Test | Coating | | |
| Sand Bayer | AR | 1.82 | — |
| HSW | AR | 3 | — |
| Sand Bayer | No AR | — | 1.52 |
| HSW | No AR | — | 3 |

Comparing Example 4 to Comparative Example E in Table 2, it was observed that incorporating a higher amount of flexible materials into the first coating material than rigid materials increased the abrasion and scratch properties after the application of sputter applied anti-reflective coating.

TABLE 1

| Material Type | | Example 1 (wt. %) | Example 2 (wt. %) | Example 3 (wt. %) | Comparative Example A (wt. %) | Comparative Example B (wt. %) | Comparative Example C (wt. %) |
|---|---|---|---|---|---|---|---|
| Flexible | | 47.2 | 47.2 | — | 47.2 | 47.2 | — |
| Flexible | | — | — | 7.8 | — | — | 7.8 |
| Highly Cross-linkable | | 47.2 | — | 37.3 | 47.2 | — | 37.3 |
| Highly Cross-linkable | | — | 47.2 | — | — | 47.2 | — |
| Highly Cross-linkable | | — | — | 9.71 | — | — | 9.71 |
| Solvent | | — | — | 19.0 | — | — | 19.0 |
| Solvent | | — | — | 24.5 | — | — | 24.5 |
| Wetting agent | | 0.24 | 0.24 | 0.19 | 0.24 | 0.24 | 0.19 |
| Initiator | | 3.77 | 3.77 | 0.99 | 3.77 | 3.77 | 0.99 |
| Initiator | | 0.94 | 0.94 | 0.25 | 0.94 | 0.94 | 0.25 |
| Surfactant | | 0.56 | 0.56 | 0.27 | 0.56 | 0.56 | 0.27 |
| Test | Coating | | | | | | |
| Sand Bayer | AR | 1.45 | 2.08 | 2.59 | | | |
| HSW | AR | 3 | 3 | 3 | | | |
| Sand Bayer | No AR | | | | 1.15 | 1.24 | 2.09 |
| HSW | No AR | | | | 5 | 3 | 3 |

Example 4 and Comparative Example E

Ophthalmic Articles with Flexible, Highly Cross-Linkable and Rigid Materials

Two substrates were coated with the formulations of the current invention. One substrate (Example 4) was subjected Comparative Examples F-H Ophthalmic Articles with Increase Amounts of Rigid Materials Six substrates were coated with the increased levels of rigid materials. Three substrates (Comparative Examples F-1, G-1, and H-1) was subjected to sputter AR coating as described in the Equipment and Process section, and then tested as described in the Testing section. The three other substrates (Comparative Examples F-2, G-2, and H-2) were not subjected to sputter AR coating. Table 3 lists formulations and testing for Comparative Examples.

Comparing the testing results in Table 3, it was observed that incorporating rigid materials has the abrasion and scratch properties decreased after the application of sputter applied anti-reflective coatings when the concentration of rigid materials was greater than the concentration of flexible materials.

TABLE 3

| Component | Material Type | Comparative Example F-1 (wt. %) | Comparative Example F-2 (wt. %) | Comparative Example G-1 (wt. %) | Comparative Example G-2 (wt. %) | Comparative Example H-1 (wt. %) | Comparative Example H-2 (wt. %) |
| --- | --- | --- | --- | --- | --- | --- | --- |
| Vinyltrimethoxysilane | Flexible | 7.01 | 7.01 | — | — | — | — |
| 1,4 butanediol diacrylate | Flexible | — | — | 19.9 | 19.9 | 8.27 | 8.27 |
| Glycidoxypropyl-trimethoxysilane | Rigid | 21.02 | 21.02 | 51.4 | 51.4 | — | — |
| Glycixypropyl-methyldiethoxysilane | Rigid | — | — | — | — | 33.1 | 33.1 |
| 50% $SiO_2$ dispersed in PTTA | Highly Cross-linkable | — | — | 9.96 | 9.96 | 33.1 | 33.1 |
| Pentaerythritol tri- and tetra acrylate | Highly Cross-linkable | 10.51 | 10.51 | — | — | — | — |
| Pentaecrythritol triacrylate | Highly Cross-linkable | 8.76 | 8.76 | — | — | 6.61 | 6.61 |
| Ethoxylated pentaerythritol tetraacrylate | Highly Cross-linkable | 17.51 | 17.51 | 9.96 | 9.96 | 13.24 | 13.24 |
| 1-methoxy-2-propanol | Solvent | 17.51 | 17.51 | — | — | — | — |
| 1-Propanol | Solvent | 14.01 | 14.01 | — | — | — | — |
| Ebecryl 1360 | Wetting Agent | 0.46 | 0.46 | 0.12 | 0.12 | 0.16 | 0.16 |
| Triarylsulfoniumhexa-fluorophosphate | Surfactant | 0.79 | 0.79 | 3.00 | 3.00 | 1.99 | 1.99 |
| Triarylsulfoniumhexa-fluoroantimonate | Surfactant | 0.26 | 0.26 | 1.00 | 1.00 | 0.66 | 0.66 |
| Darocure 1173 | Initiator | 1.32 | 1.32 | 3.20 | 3.20 | 1.99 | 1.99 |
| Irgacure 819 | Initiator | 0.33 | 0.33 | 0.80 | 0.80 | 0.50 | 0.50 |
| FC-4434 | Surfactant | 0.53 | 0.53 | 0.66 | 0.66 | 0.39 | 0.39 |
| Test | Coating | | | | | | |
| Sand Bayer | AR | 0.95 | — | 1.33 | — | 0.76 | — |
| HSW | AR | 5 | — | 3 | — | 5 | — |
| Sand Bayer | No AR | — | 1.29 | — | 2.00 | — | 1.41 |
| HSW | No AR | — | 3 | — | 3 | — | 5 |

Example 5 and Comparative Example I

Ophthalmic Articles with Flexible and Highly Cross-Linkable Materials

Two substrates were coated with the formulations of the current invention. One substrate (Example 5) was subjected to sputter AR coating as described in the Equipment and Process section, and then tested as described in the Testing section. The other substrate (Comparative Example I) was not subjected to sputter AR coating. Table 4 lists formulations and testing for Example 5 of the present invention and Comparative Example I. The flexible, highly cross-linkable, solvents and initiators can be any of the compounds described in the above sections.

TABLE 4

| Material Type | Example 5 (Wt. %) | Comparative Example I (Wt. %) |
| --- | --- | --- |
| Flexible | 7.86 | 7.86 |
| Highly Cross-linkable | 27.52 | 27.52 |
| Highly Cross-linkable | 35.38 | 35.38 |
| Highly Cross-linkable | 5.90 | — |
| Highly Cross-linkable | 0.20 | 9.83 |
| Highly Cross-linkable | 0.99 | 11.79 |
| Highly Cross-linkable | 0.25 | 5.90 |
| Solvent | 9.83 | — |

TABLE 4-continued

| Material Type | Example 5 (Wt. %) | Comparative Example I (Wt. %) |
| --- | --- | --- |
| Solvent | 11.79 | — |
| Wetting Agent | 0.28 | 0.20 |
| Initiator | | 0.99 |
| Initiator | 2.17 | 0.25 |
| Initiator | 2 | 0.28 |
| Test Coating | | |
| Sand Bayer AR | 2.17 | — |
| HSW AR | 2 | — |
| Sand Bayer No AR | — | 2.09 |
| HSW No Ar | — | 3 |

Comparing Example 5 to Comparative Example I in Table 4, it was observed that incorporating flexible materials into the first coating material containing highly cross-linkable materials increased the abrasion and scratch properties after the application of sputter applied anti-reflective coating.

Comparative Examples J and K (Articles with Highly Cross-Linkable Materials)

Four substrates were coated with highly cross-linkable materials. Two substrates (Comparative Example J-1 and K-1) were subjected to sputter AR coating as described in the Equipment and Process section, and then tested as described in the Testing section. The two other substrates (Comparative Examples J-2 and K-2) were not subjected to sputter AR coating. Table 5 lists formulations and testing for Example 4 of the present invention and Comparative Examples K and J.

From the results in Table 5, it was observed that composition having no flexible materials in the first coating material containing did not increase the abrasion and scratch properties after the application of sputter applied anti-reflective coating.

TABLE 5

| Component | Material Type | Comparative Example J-1 (Wt. %) | Comparative Example J-2 (Wt. %) | Comparative Example K-1 | Comparative Example K-2 |
|---|---|---|---|---|---|
| 1,4 butanediol diacrylate | Flexible | — | — | — | — |
| 50 wt. % $SiO_2$ dispersed in 1-methoxy-2-propanol | Highly Cross-linkable | 26.91 | 26.91 | — | — |
| $SiO_2$ dispersed in isopropyl alcohol | Highly Cross-linkable | 36.67 | 36.67 | — | — |
| 1-methoxy-2-propanol | Solvent | — | — | 18.76 | 18.76 |
| Isopropyl alcohol | Solvent | — | — | 25.57 | 25.57 |
| 50 wt. % $SiO_2$ dispersed in PTTA | Highly Cross-linkable | — | — | 35.84 | 35.84 |
| Pentaerythritol tri- and tetraacrylate | Highly Cross-linkable | 10.18 | 10.18 | 9.96 | 9.96 |
| Pentaerythritol triacrylate | Highly Cross-linkable | 8.15 | 8.15 | 8.12 | 8.12 |
| Ethoxylated pentaerythritol tetraacrylate | Highly Cross-linkable | 16.3 | 16.3 | — | — |
| Ebecryl 1360 wetting agent | Wetting Agent | 0.24 | 0.24 | 0.24 | 0.24 |
| Darocure 1173 | Initiator | 0.99 | 0.99 | 0.99 | 0.99 |
| Irgacure 819 | Initiator | 0.25 | 0.25 | 0.25 | 0.25 |
| FC-4434 | Initiator | 0.28 | 0.28 | 0.28 | 0.28 |
| Test | Coating | | | | |
| Sand Bayer | AR | 1.84 | — | 1.94 | — |
| HSW | AR | 3.0 | — | 3 | — |
| Sand Bayer | No AR | — | 1.92 | — | 2.41 |
| HSW | No Ar | — | 3.0 | — | 3.67 |

The invention claimed is:

1. An ophthalmic article comprising:
   a first coating comprising an abrasion resistant coating comprising at least one flexible material having a glass transition temperature ranging from −150° C. to 25° C., wherein the abrasion resistant coating is radiation-cured; and
   a second coating comprising a sputter-applied anti-reflective (AR) coating,
   wherein the ophthalmic article has a Bayer value of at or between 1.25 and 2.6 and a hand steel wool value of 3 or less.

2. The ophthalmic article of claim 1, wherein the second coating is adhered directly to the first coating.

3. The ophthalmic article of claim 1, wherein the at least one flexible material comprises at least one of an aliphatic epoxy, a difunctional acrylate, a vinyl silane, a vinyl ether, a urethane, or a polyester.

4. The ophthalmic article of claim 1, wherein the first coating further comprises at least one rigid material, wherein the rigid material comprises at least one of an epoxy alkoxysilane, a mono-organoalkoxysilane, a tetraorganoxysilane, or a polyorganoxysiloxane.

5. The ophthalmic article of 4, wherein the first coating comprises flexible material in a greater weight amount than a weight amount of rigid material.

6. The ophthalmic article of claim 1, wherein the first coating further comprises highly cross-linkable materials, wherein the highly cross-linkable materials comprise at least one of $SiO_2$, pentaerythritol tri- and tetra acrylate, pentaerythritol triacrylate, ethoxylated pentaerythritol tetraacrylate, dipentaerythritol pentaacrylate, or dipentaerthritolhexaacrylate.

7. The ophthalmic article of claim 1, wherein the first coating is a single layer.

8. The ophthalmic article of claim 1, wherein the anti-reflective coating comprises at least four layers.

9. A method of manufacturing an ophthalmic article comprising:
   applying a first coating to an ophthalmic article, wherein the first coating comprises a radiation-curable abrasion resistant coating comprising at least one flexible material having a glass transition temperature ranging from −150° C. to 25° C.;
   radiation-curing the first coating; and
   sputter-applying a second coating onto the first coating, the second coating comprising an anti-reflective coating;
   wherein the article, after application of the second coating, has a Bayer value of at or between 1.25 and 2.6 and a hand steel wool value of 3 or less.

10. The method of claim 9, wherein the second coating is adhered directly to the first coating.

11. The method of claim 9, wherein the at least one flexible material comprises at least one of an aliphatic epoxy, a difunctional acrylate, a vinyl silane, a vinyl ether, a urethane, a polyester, or any combination thereof.

12. The method of claim 9, wherein the first coating further comprises at least one rigid material, wherein the rigid material comprises at least one of an epoxy alkoxysilane, a mono-organoalkoxysilane, a tetraorganoxysilane, or a polyorganoxysiloxane, and wherein a weight amount of flexible material is greater than a weight amount of rigid material.

13. The method of claim 9, wherein the first coating is a single layer.

14. The method of claim 9, wherein the anti-reflective coating comprises at least four layers.

15. An ophthalmic article manufactured by the method of claim 9.

16. The ophthalmic article of claim 1, wherein the first coating further comprises at least one rigid material.

17. The ophthalmic article of claim 1, wherein the first coating further comprises at least one rigid material having a glass transition temperature ranging from 25° C. to 250° C.

18. The method of claim 9, wherein the first coating further comprises at least one rigid material.

19. The method of claim 9, wherein the first coating further comprises at least one rigid material having a glass transition temperature ranging from 25° C. to 250° C.

* * * * *